Jan. 16, 1923.
A. LAGACHE.
SYSTEM OF COUPLING ENABLING HEAVY LOADS TO BE TOWED.
FILED JULY 19, 1919.

Inventor –
André Lagache
By
B. Singer, Atty.

Patented Jan. 16, 1923.

1,442,077

UNITED STATES PATENT OFFICE.

ANDRÉ LAGACHE, OF PARIS, FRANCE, ASSIGNOR TO SOCIÉTÉ DES TRAINS CHENARD & WALCKER F. A. R., OF GENNEVILLIERS, FRANCE.

SYSTEM OF COUPLING ENABLING HEAVY LOADS TO BE TOWED.

Application filed July 19, 1919. Serial No. 312,063.

*To all whom it may concern:*

Be it known that I, ANDRÉ LAGACHE, residing at Paris, France, have invented new and useful Improvements in Systems of Coupling Enabling Heavy Loads to be Towed, of which the following is a specification.

The invention relates to a system of coupling enabling heavy loads to be towed by means of a light tractor. To that end, according to the invention, a part of the weight of the trailed four wheel vehicle is transferred to the tractor vehicle (for instance a motor vehicle). The fore-carriage of the trailer is secured to a rigid shaft which rests on a point of the tractor, the height of which above the ground can be modified at will.

In this way, the rear of the tractor, placed on a weigh-bridge, shows an increase of weight equal to the weight by which the trailer has been lightened.

The accompanying drawings show a construction according to the invention. In the example illustrated it has been assumed that it is the case of a motor tractor and of a four-wheel trailer with a fore-carriage mounted on a pivoted ring.

Figure 1:
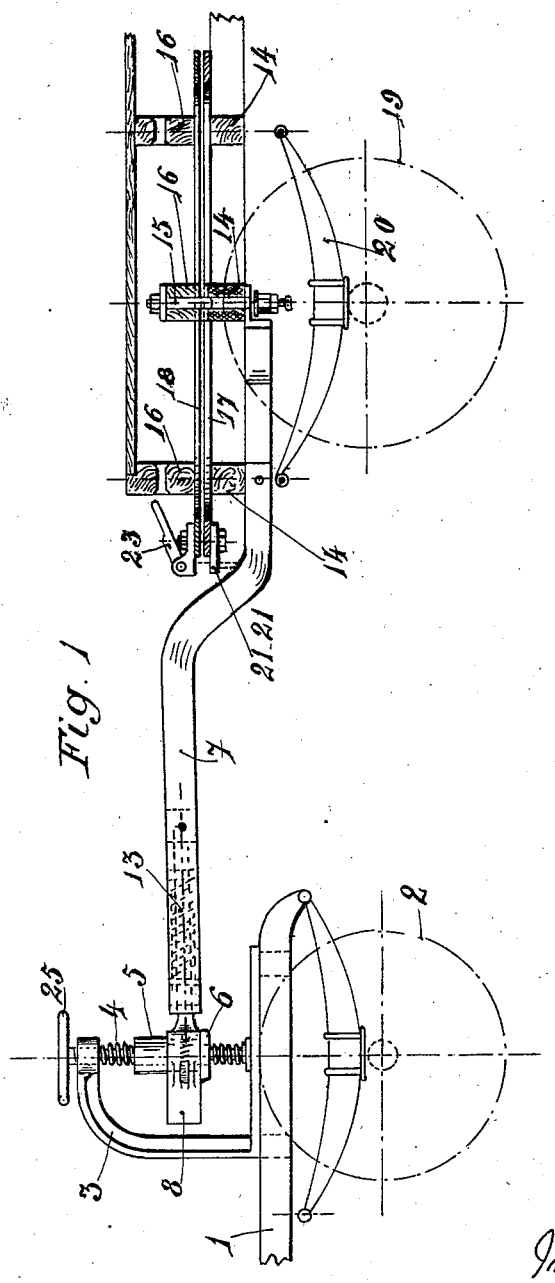
Figures 1 and 2 show in elevation and in plan the rear part of the tractor and the front part of the four-wheel trailer which it pulls.
Figure 2:
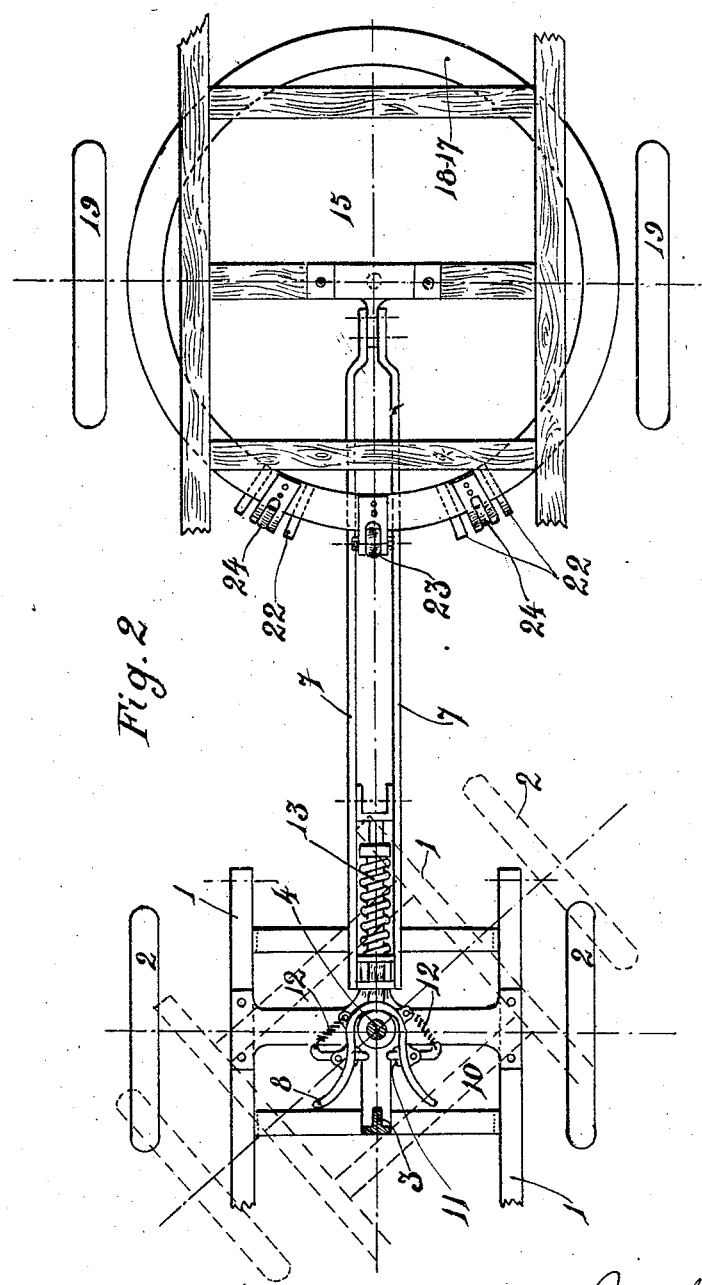
Figure 3:
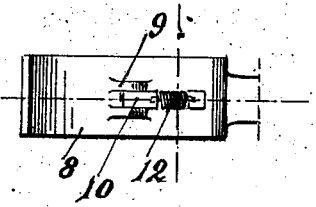
Figures 3 and 4 show in elevation and in plan the hooking mechanism.
Figure 4:
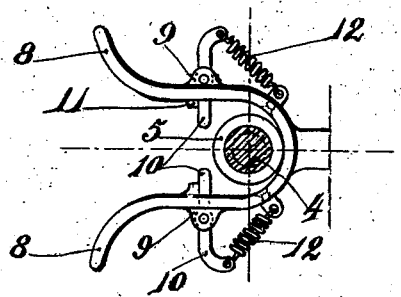

In the construction illustrated in Figures 1 and 2, the tractor chassis is provided, in vertical line with the rear wheels, with a screw 4, the axis of which can turn freely in a bracket 3. This screw is secured to a hand wheel 25. On the screw 4 is mounted a nut 5 provided at the bottom with a collar 6 on which rests the end of the shaft 7 of the trailer. This end has a fork 8, the branches of which rest on the collar 6 and extend at either side of the nut 5 (Figures 3 and 4).

Each branch of the fork 8 has outside a lug 9 to which is pivoted a holding finger or pawl 10 which in its closing position strikes against stops 11. The finger 10 is normally in engagement with the said stops owing to the traction of an outer spring 12.

The shaft 7 of the trailer is preferably mounted as shown in Figures 1 and 2; it is provided inside with a shock absorbing spring 13 and rigidly connected by means of cross-bars 14, to a ring 17 which can turn under a ring 18 connected by cross-bars 16 to the chassis of the trailer.

Figure 5:
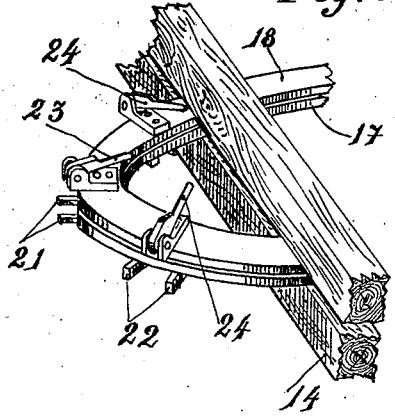
Figure 5 is a detail view of the fore-carriage of the trailer.

A hinge pin 15 secured to the central cross-bar 16 and rotatable relatively to the central cross-bar 14, is arranged in the centre of the rings 17 and 18 in vertical line with the front wheels 19, the springs 20 of which are connected to the cross bars 14. The rings 16 and 18 are preferably provided with a stop device shown in Figure 5.

Stops 21 and 22 arranged in couples, are secured to the ring 17, and between the said stops can engage fingers or pawls 23 and 24 pivoted to the ring 18. The distance between the stops of one and the same pair, are different, for instance the stops 21 do not leave any play when the finger 23 is engaged between them, which prevents any turning of the fore-carriage of the trailer. On the contrary, the stops 22 allow of a certain turning, for instance to 10 degrees.

It is therefore possible, by lowering the finger 23, to do away with any turning of the fore-carriage and to push the trailer back in a straight line; it is also possible, by lowering the finger 24, to limit the turning of the fore-carriage and to facilitate its movement backwards.

The system forming the subject of the invention, enables the adhesion of the tractor to be modified at will.

In fact, the trailer having been hooked it is sufficient to turn the hand wheel 25 in a suitable direction in order to raise the nut 5, to lift, by means of the collar 6, the shaft and consequently the whole of the front of the trailer, and to increase at will the fraction of weight of the trailer which is supported by the tractor. The adhesion weight of the driving wheels can thus be adjusted in a suitable manner, whatever be the weight of the tractor, and is limited only by the weight of the trailer.

The hooking of the trailer to the tractor is effected in a very simple manner; it is sufficient to move the tractor back so as to bring the nut 5 into engagement with the two fork, the said nut pushes back the two fingers 10 which, as soon as they are released, return to their normal position and thus hold the nut in the fork. The driver can thus easily hook the trailer without the assistance of a third party.

As will be seen in Figure 1, the shaft 7 is sufficiently high not to interfere in any way with the turning of the tractor on its rear wheels.

It is therefore possible to make a very short half-turn, the tractor moves back in turning so as to bring the rear wheels and the chassis into the position shown dotted in Figure 2. The tractor then advances towing the trailer, and turns on the spot.

It goes without saying the invention is not limited to the constructions illustrated, and the construction of the details could be modified.

I claim—

A coupling device between vehicle and trailer, whose weight is partially carried by the vehicle, and comprising a yoke on the front axle of the trailer and a tongue pivotally secured to the king pin of the fifth wheel, latch levers on one member of the fifth wheel, and pairs of lugs on the other member to restrict the steering movement of said tongue when desired.

In testimony whereof I affix my signature.

ANDRÉ LAGACHE.